3,806,428
POTENTIOMETRIC NITRIC OXIDE ANALYSIS
Morton Beltzer, Westfield, N.J., assignor to Esso Research and Engineering Company
Filed Sept. 1, 1972, Ser. No. 285,822
Int. Cl. G01n 27/46
U.S. Cl. 204—1 T    5 Claims

ABSTRACT OF THE DISCLOSURE

An analyzer for the measurement of nitric oxide, particularly when in combination with automotive exhaust gases, measures nitric oxide concentration as a function of the voltage measured by a potentiometric cell comprising ferrous and ferric salts dissolved in a suitable solvent. Nitric oxide complexes ferrous ions, thus creating an electrochemical voltage relative to a cell which has not been exposed to the nitric oxide. This change in voltage is proportional to the logarithm of the nitric oxide concentration. The analyzer is usable with gases containing less than 100 parts per million and up to pure NO and is not affected by the presence of other gases.

BACKGROUND OF THE INVENTION

The present invention relates to a method and apparatus for measuring nitric oxide present in automotive exhaust gases. Increasing concern with atmospheric pollution resulting from automotive exhaust gases has led to the establishment of standards for known polluting materials present in those gases, notably unburned hydrocarbons, carbon monoxide, and nitrogen oxides. Up to the present time, the principal emphasis has been upon measurement and control of the amount of hydrocarbons and carbon monoxide. However, beginning in 1975, federal standards also will require the control of nitrogen oxides. These oxides are important because they react in the presence of sunlight to form a number of complex compounds which are significant contributors to air pollution in the formation of smog.

Of the various nitrogen oxides, the main concern is with nitric oxide (NO) and nitrogen dioxide ($NO_2$). Nitric oxide is the principal nitrogen oxide formed in the high temperature reaction between air and hydrocarbon fuels that constitutes the internal combustion process. However, at lower temperatures and in the presence of excess air nitric oxide may be converted to nitrogen dioxide. The ratio of the two oxides varies, depending on a number of variables e.g., sunlight, oxygen, or other oxidizing or reducing agents. Both oxides are usually lumped together and termed $NO_x$.

The importance of the nitrogen oxides in atmospheric pollution makes it highly desirable to have means available for analyzing the concentrations thereof. A number of techniques and analytical methods are available. For a survey see "The Oxides of Nitrogen and Their Detection in Automotive Exhaust," Journal of Chemical Education, vol. 49, No. 1, January 1972. Not all methods presented therein are easily applied to the analysis of exhaust gases being produced from an automobile engine. For routine testing an analyzer requires quick response, reasonable accuracy, low cost, and reliability. Prior art techniques most likely to be used include (1) the nitrate-specific ion electrode (see the Chand et al. U.S. Pat. 3,622,487), (2) homogeneous chemiluminescence, (3) gas chromatography, and (4) phenol-disulphonic acid method. All of the foregoing methods suffer from one or more disadvantages, e.g., high cost, slow response, interference by other chemical components in exhaust gases.

A method has been discovered which overcomes the deficiencies of the prior art. Specifically, this novel technique will rapidly analyze nitric oxide in the exhaust gases from an internal combustion engine at low cost and without interference by other components in the exhaust.

SUMMARY OF THE INVENTION

An instrument for the detection of nitric oxide, according to the present invention, utilizes an electrochemical system of ferrous and ferric salts in specially chosen solutions. Nitric oxide will complex with ferrous ions preferentially and thereby will shift the equilibrium of the ferrous-ferric ions system relative to a similar solution which has not been exposed to nitric oxide. Voltages can be generated which are proportional to the logarithm of the nitric oxide content of the gas to which the solution has been exposed. The results approximate a straight line on semi-logarithmic paper when plotting nitric oxide content versus voltage. The instrument may thus be used to measure nitric oxide content of exhaust gases since the system has been selected to be unresponsive to other gases which are present in the exhaust system. By proper selection of the solvents, the sensitivity of the system, the voltage generated and stability are adjusted to give the optimum performance. The nature of the electrochemical system is such that polarization of the electrodes is not a problem, permitting the lowest cost possible in the construction of an instrument according to this invention.

DESCRIPTION OF THE PREFERRED EMBODIMENT

Figure 1:
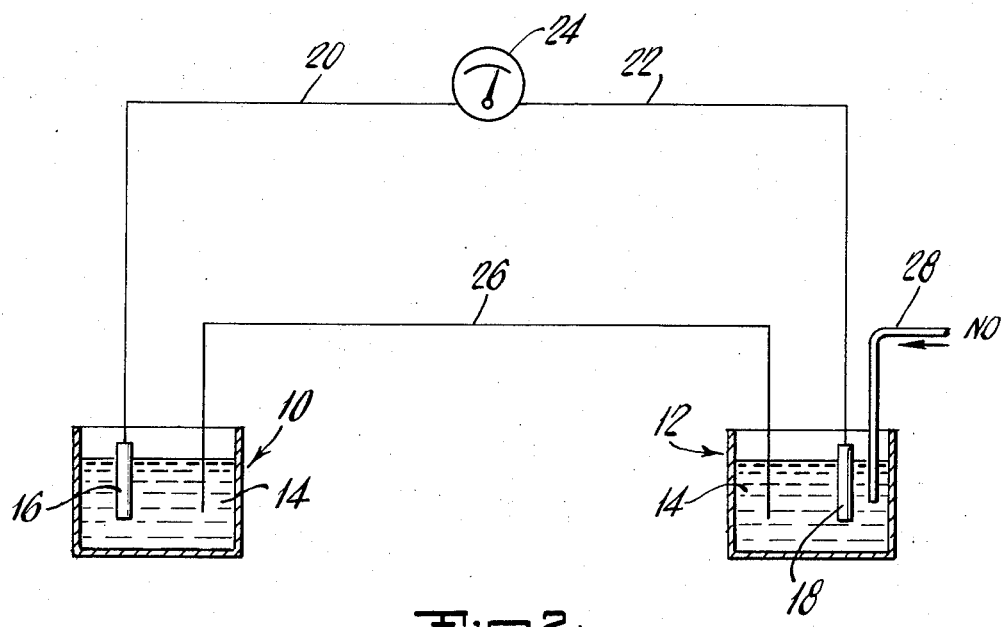
FIG. 1 shows a schematic illustration of a detector constructed according to the present invention.

The detection and measurement of nitric oxide (NO) in a gas utilizes the voltage generated by the complexing of NO with ferrous ions in a ferric/ferrous solution. A schematic of an analyzer constructed according to the invention is shown in FIG. 1. The following summarizes briefly the theoretical basis for such an NO analyzer.

Ferrous and ferric salts dissolved in a variety of solvents behave as a reversible electrochemical oxidation-reduction system. As such, the voltage-concentration relationship can be accurately described by the Nernst equation given as follows:

$$E = E° + 2.303 \frac{RT}{F} \text{Log} \frac{[Fe^{+3}]}{[Fe^{+2}]} \quad (1)$$

where: E=voltage of the system relative to a reference electrode. E°=the standard voltage for the given solvent system. R=the gas constant, T=the absolute temperature, F=Faraday, $[Fe^{+3}]$=concentration of ferric ions, $[Fe^{+2}]$=concentration of ferrous ions.

If total concentration of the ions is represented by $C_O$ and $\alpha$ represents the fraction of the total concentration due to ferrous ions, then it follows that:

$C_{Fe^{+3}} = C_O(1-\alpha)$ = concentration
$\qquad\qquad\qquad\qquad$ of ferric ions = $[Fe^{+3}]$   (2)

$C_{Fe^{+2}} = C_O\alpha$ = concentration of
$\qquad\qquad\qquad\qquad$ ferrous ions = $[Fe^{+2}]$   (3)

Substituting these relationships into Equation 1 the following may be derived:

$$E_1 = \text{initial voltage} = E° + 2.303 \frac{RT}{F} \log\left[\frac{1-\alpha}{\alpha}\right]$$
$$(4)$$

The voltage depends upon the ratio of ferric to ferrous ions. If this ratio is changed, a voltage will be generated relative to the initial condition which can be measured.

The ferrous ions can be effectively removed from the solution by complexing with NO according to the following equation:

$$Fe^{+2} + NO \text{ (Gas)} \rightarrow Fe(NO)^{+2} \quad (5)$$

for which reaction the equilibrium constant is:

$$K = \frac{Fe(NO)^{+2}}{P_{NO}(Fe^{+2})} \text{ where } P_{NO} = \text{partial pressure of NO} \quad (6)$$

If $f$ is the fraction of the ferrous ions complexed, then the residual uncomplexed ferrous ions concentration is:

$$[Fe^{+2}] = C_0(\alpha)(1-f) \quad (7)$$

and the concentration of complexed ferrous ions is:

$$[Fe(NO)^{+2}] = C_0 \alpha f \quad (8)$$

The voltage of the system when complexed by the introduction of NO is represented by a revision to Equation 1 according to Equation 9:

$$E_2 = \text{voltage after complexing} = E^\circ + 2.303 \frac{RT}{F} \log \frac{(1-\alpha)}{(\alpha)(1-f)} \quad (9)$$

Combining Equations 4 and 9 to determine the difference in voltage between the system before and after complexing of ferrous ions by NO:

$$\Delta E = \frac{\text{voltage}}{\text{generated}} = E_2 - E_1 = -2.303 \frac{RT}{F} \log(1-f) \quad (10)$$

Typical values of the voltage generated by complexing fractions of the ferrous ion content are given in Table 1.

TABLE 1

| Fraction of $Fe^{+2}$ complexed ($f$): | E (volts) |
|---|---|
| 0 | 0 |
| 0.01 | 0.0003 |
| 0.10 | 0.0027 |
| 0.20 | 0.0058 |
| 0.50 | 0.018 |
| 0.60 | 0.024 |
| 0.80 | 0.042 |
| 0.90 | 0.060 |
| 0.95 | 0.078 |
| 0.98 | 0.102 |
| 0.99 | 0.120 |

To obtain significant voltages, it is necessary that relatively large fractions of the ferrous ion content be complexed. The equilibrium constant for the complexed solution may also be expressed by substituting Equations 7 and 8 into Equation 6 to obtain:

$$K = \frac{f}{(1-f)P_{NO}} \quad (11)$$

It will be seen that the fraction complexed is a function of both the equilibrium constant and the partial pressure of NO. Some typical values are given in Table 2 below.

TABLE 2

| | Fraction complexed, $f$ at— | | | |
|---|---|---|---|---|
| $P_{NO}$ (atmos.) | $K=10^2$ | $K=10^3$ | $K=10^4$ | $K=10^5$ |
| 1×10⁻⁴ (100 p.p.m.) | 0.010 | 0.090 | 0.50 | 0.910 |
| 2×10⁻⁴ (200 p.p.m.) | 0.020 | 0.167 | 0.67 | 0.950 |
| 5×10⁻⁴ (500 p.p.m.) | 0.048 | 0.330 | 0.83 | 0.980 |
| 1×10⁻³ (1,000 p.p.m.) | 0.090 | 0.500 | 0.91 | 0.990 |
| 2×10⁻³ (2,000 p.p.m.) | 0.167 | 0.670 | 0.95 | |
| 5×10⁻³ (5,000 p.p.m.) | 0.330 | 0.830 | 0.98 | |
| 1×10⁻² (10,000 p.p.m.) | 0.500 | 0.910 | 0.99 | |

Substituting the relationship of Equation 11 into Equation 10 the following relationship is obtained:

$$\Delta E = 2.3 \frac{RT}{F} \log(1 + K P_{NO}) \quad (12)$$

When $KP_{NO} \gg 1$ then:

$$\Delta E = 2.3 \frac{RT}{F} \log K P_{NO} \quad (13)$$

whereby a plot of voltage versus $P_{NO}$ yields a straight line on logarithmic paper. Once the equilibrium constant for any actual solution has been determined by experimental measurement it is possible to calculate the voltage generated by various partial pressures of NO. Experimental values in Table 3 for a system comprising a 0.01 molar solution of ferric chloride in formamide and propylene carbonate when exposed to varying concentrations of NO may be compared with typical calculated values for assumed equilibrium constants from Table 2.

TABLE 3

| | Calc. voltage, millivolts at— | | | Measured voltage, millivolts | |
|---|---|---|---|---|---|
| $P_{NO}$ (atmos.) | $K=10^4$ | $K=10^5$ | $K=10^8$ | 0.01 M $FeCl_2$ in formamide | 0.01 M $FeCl_2$ in propylene carbonate |
| 1×10⁻⁴ (100 p.p.m.) | 18 | 62 | 240 | 31 | 245 |
| 2×10⁻⁴ (200 p.p.m.) | 29 | 79 | 262 | 43.5 | 263 |
| 5×10⁻⁴ (500 p.p.m.) | 47 | 102 | 284 | 63 | 283 |
| 1×10⁻³ (1,000 p.p.m.) | 62 | 120 | 298 | 79.5 | 300 |
| 2×10⁻³ (2,000 p.p.m.) | 79 | 138 | 317 | 97 | 315 |
| 5×10⁻³ (5,000 p.p.m.) | 102 | 161 | 341 | 121 | 337 |

From these results it can be seen that for $FeCl_2$ in formamide the experimental equilibrium constant lies between $K=10^4$ and $K=10^5$ and, in fact, the value is about $2.24 \times 10^4$. For $FeCl_2$ in propylene carbonate, the equilibrium constant is about $0.99 \times 10^8$.

This method can measure NO concentration over the range of 100 parts per million to pure NO with an essentially linear relationship when plotted on semi-logarithmic paper. Below the hundred parts per million level the line begins to curve but readily measurable voltages are obtainable down to approximately 10 p.p.m.

The drawing schematically illustrates an analyzer by which such measurements may be taken. A suitable container 10 holds a solution of ferrous and ferric ions which is measured relative to an equivalent solution in a container 12. Electrodes 16 and 18 are immersed in their respective containers 10 and 12. The electrodes are connected via wires 20 and 22 to a conventional voltmeter or potentiometer 24. The circuit is completed by a salt bridge 26. When a gas containing NO is introduced into container 12 via tube 28, the NO will react rapidly with the ferrous ions therein, complexing them and creating a voltage change which is proportional to the NO content of the incoming gas. The resultant voltage is indicated on the read out unit 24.

Although in the experimental apparatus which provided data for Table 3, platinum electrodes were immersed in a formamide solution containing ferric chloride; other systems would be expected to give equally suitable results. Other electrodes including, but not limited to, the following may be used: platinum, gold, mercury, carbon, titanium nitride, and various amalgum electrodes. Other high dielectric solvents generally having a dielectric constant greater than 40 may be used. Organic solvents used in organic electrolyte batteries are suitable. Typical solvents would include, but are not limited to, organic carbonates such as dimethyl carbonate, organic sulfites such as dimethyl sulfite, formamides such as n-methyl formamide and dimethyl formamide, organic sulfoxides such as dimethyl sulfoxide and tetramethylene sulfoxide, organic sulfanes such as dimethyl sulfane, dioxanes, nitriles, and sulfonamides such as ethane sulfonamide. Preparation of a solvent may include mixing two or more of the solvents. Also, water may be mixed with one or more members of the solvent group. Note that as shown in FIG. 3, the sensitivity of the device is affected by the choice of the solvent system.

The properties of the system are such that it exhibits thermodynamic equilibrium. The high degree of reversibility means that the electrode potentials are essentially unaffected when an electric current flows across the interface and, therefore, the electrodes are not readily polarized. This property, in turn, means that the voltage generated may be measured using inexpensive voltmeters which require some current to function. This being the case, the analyzer may be a relatively inexpensive instrument in contrast to the expensive instruments typical with prior art techniques. In addition, the high degree of reversibility also means that the system is insensitive to contaminants, making it particularly suitable for use in automobile exhaust analysis.

Figure 2:
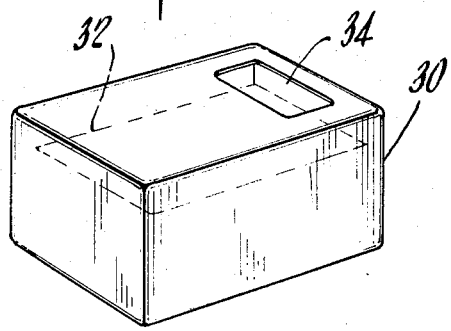
FIG. 2 shows a disposable solution container for facilitating replacement of a solution after use.

The decomposition of the $Fe(NO)^{+2}$ complex is slow and therefore it is necessary to provide fresh solution for each measurement. This may be done by utilizing standard solutions in single-use, throw-away type containers which give a "plug-in" feature to the instrument. FIG. 2 shows a simple plastic container 30 which contains fresh solution 32, which may be exposed by removing a tear-off strip 34, just prior to insertion into the instrument for analysis. Alternatively, more complex techniques may be used to supply a fresh solution from a larger container. For example, spent solution could be drained from a container and replaced by a metered amount of fresh solution pumped in before each test. Regeneration of the solution by decomplexing also may be used.

The foregoing description of the preferred embodiment of the invention does not limit the scope of the invention which is covered by the claims which follow.

What is claimed is:

1. A method for measuring the NO content of a gas comprising:
   (a) admitting said NO containing gas to a first solution containing ferrous and ferric ions;
   (b) measuring the voltage difference between a first electrode immersed in said first solution and a second electrode immersed in a second solution containing ferrous and ferric ions and not in contact with said NO containing gas said two solutions being electrolytically connected;
   (c) comparing said voltage difference of (b) with a previously determined correlation between NO content of a gas and the voltage generated, thereby obtainnig the NO content of said gas.

2. The method of claim 1 wherein the solutions comprise ferrous chloride in a suitable solvent.

3. The method of claim 2, wherein said solvent comprises a polar liquid having a dielectric constant above 40.

4. The method of claim 3 wherein said solvent is selected from the group consisting of formamides, organic carbonates, organic sulfites, sulfoxides, sulfanes, dioxanes, nitriles, sulfonamides, and mixtures thereof.

5. The method of claim 2 wherein said solvent is water mixed with at least one member of the group consisting of formamides, organic carbonates, organic sulfites, sulfoxides, sulfanes, dioxanes, nitriles and sulfonamides.

References Cited

UNITED STATES PATENTS

| | | | |
|---|---|---|---|
| 3,179,581 | 4/1965 | Lewin et al. | 204—195 R |
| 3,622,487 | 11/1971 | Chand et al. | 204—IT |

TA-HSUNG TUNG, Primary Examiner

U.S. Cl. X.R.

204—195 R